United States Patent
Wierzbicki et al.

(10) Patent No.: US 7,127,621 B2
(45) Date of Patent: Oct. 24, 2006

(54) PEER POWER CONTROL

(75) Inventors: Robert P. Wierzbicki, Worcester, MA (US); Phillip J. Roux, Sutton, MA (US)

(73) Assignee: EMC Corporation, Hopkinton, MA (US)

(*) Notice: Subject to any disclaimer, the term of this patent is extended or adjusted under 35 U.S.C. 154(b) by 533 days.

(21) Appl. No.: 10/327,483

(22) Filed: Dec. 21, 2002

(65) Prior Publication Data

US 2004/0123165 A1 Jun. 24, 2004

(51) Int. Cl.
*G06F 1/26* (2006.01)
*G06F 11/01* (2006.01)

(52) U.S. Cl. .................. 713/300; 714/10; 714/11; 714/23

(58) Field of Classification Search ........... 713/300, 713/324; 714/10, 11, 23, 22, 24; 307/31; 711/11, 14, 22, 23, 24
See application file for complete search history.

(56) References Cited

U.S. PATENT DOCUMENTS

| | | | | |
|---|---|---|---|---|
| 4,128,771 A | * | 12/1978 | Domenico | ............ 307/52 |
| 4,455,601 A | * | 6/1984 | Griscom et al. | ............ 714/13 |
| 5,721,932 A | * | 2/1998 | Itoh et al. | ............ 713/323 |
| 5,761,084 A | * | 6/1998 | Edwards | ............ 700/293 |
| 6,351,823 B1 | * | 2/2002 | Mayer et al. | ............ 714/10 |
| 6,477,139 B1 | * | 11/2002 | Anderson et al. | ............ 370/216 |

* cited by examiner

*Primary Examiner*—Thomas Lee
*Assistant Examiner*—Mark Connolly
(74) *Attorney, Agent, or Firm*—McGuinness & Manaras LLP

(57) ABSTRACT

According to one aspect of the invention, a power control architecture is provided wherein each one of a pair of devices controls the provision of power to the other device of the pair. In one embodiment of the invention, at least one power supply is coupled to each one of the pair of devices. The invention includes methods and apparatus that enable each device to reset the other device by signaling the power supplies to cycle power to that device. In addition, the invention includes methods and apparatus to preclude each device from erroneously cycling the power of the other device. With such an arrangement, processor reset functionality may be provided in a high availability system without the inclusion of one or more supervisory processors in the design, thereby reducing the overall cost and complexity of the supervisory functionality.

20 Claims, 4 Drawing Sheets

PEER POWER CONTROL

FIELD OF THE INVENTION

The present invention relates generally to high availability systems and more particularly to power control in high availability systems.

BACKGROUND OF THE INVENTION

To provide consistent, high performance client support, businesses typically rely on high availability systems. High availability systems are designed with some level of redundancy in order to provide fault tolerance for single points of failure. For example, two components that are typically replicated in high availability designs include the processor and power supply. Thus, in the event that one of the processors or power supply fails, the redundant pair can be used to support the processing goals of the subsystem.

One feature which is often requested in high availability systems is the ability to reset one of the processors should the processor become unstable. In typical high-availability designs the processor reset function is provided as one component of a layered supervisory function. The layered supervisory function includes, in many models, a high level Supervisor that monitors the processors' operating status and sanity by regularly polling the processor for status information. The Supervisor is generally implemented in a combination of hardware and software. During operation, the Supervisor communicates with a lower level supervisory processor (SP) that is generally physically located on the same physical module as the processor being monitored. During operation, if the processor should get into an unrecoverable state, it needs to be reset. The SP acts in response to commands from the Supervisor to reset the processor. To then reset the processor, the SP issues commands to the power supply associated with the failed processor, to cycle the power to the failed processor. During the power cycle, the power supply is disconnected from the failed processor for a predetermined period of time and then is reconnected. When power is reconnected to the failed processor, the processor undergoes its predefined initialization procedures, hopefully getting the processor back into an operable state.

One problem with using the above described layered supervisor function is that in order to ensure high-availability at least one redundant copy of the Supervisor, and advantageously the SP, should be provided. Without the additional copy of the Supervisor and SP, a fault could result in the inability to properly observe and reset the associated processor. However, providing an additional copy of the Supervisor and SP pair introduces additional hardware, cost and complexity to the system design. Thus, the inherent problem of redundancy is encountered, where cost is incurred without any added system performance. It would be desirable to determine a low-cost method for providing system reset in a high-availability system.

SUMMARY OF THE INVENTION

According to one aspect of the invention, a power control architecture is provided wherein each one of a pair of devices controls the provision of power to the other device of the pair. In one embodiment of the invention, at least one power supply is coupled to the pair of devices. The invention includes methods and apparatus that enable each device to reset the other device by signaling the power supply to cycle power to that device. In addition, the invention includes methods and apparatus to preclude each device from erroneously cycling the power of the other device.

With such an arrangement, processor reset functionality may be provided in a high availability system by totally eliminating the SP from the supervisory function design. Eliminating the SP from the layered supervisory function reduces the overall cost and complexity of the layered supervisory function, since redundant copies of the SP are not needed and the design of the Supervisor may be simplified.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
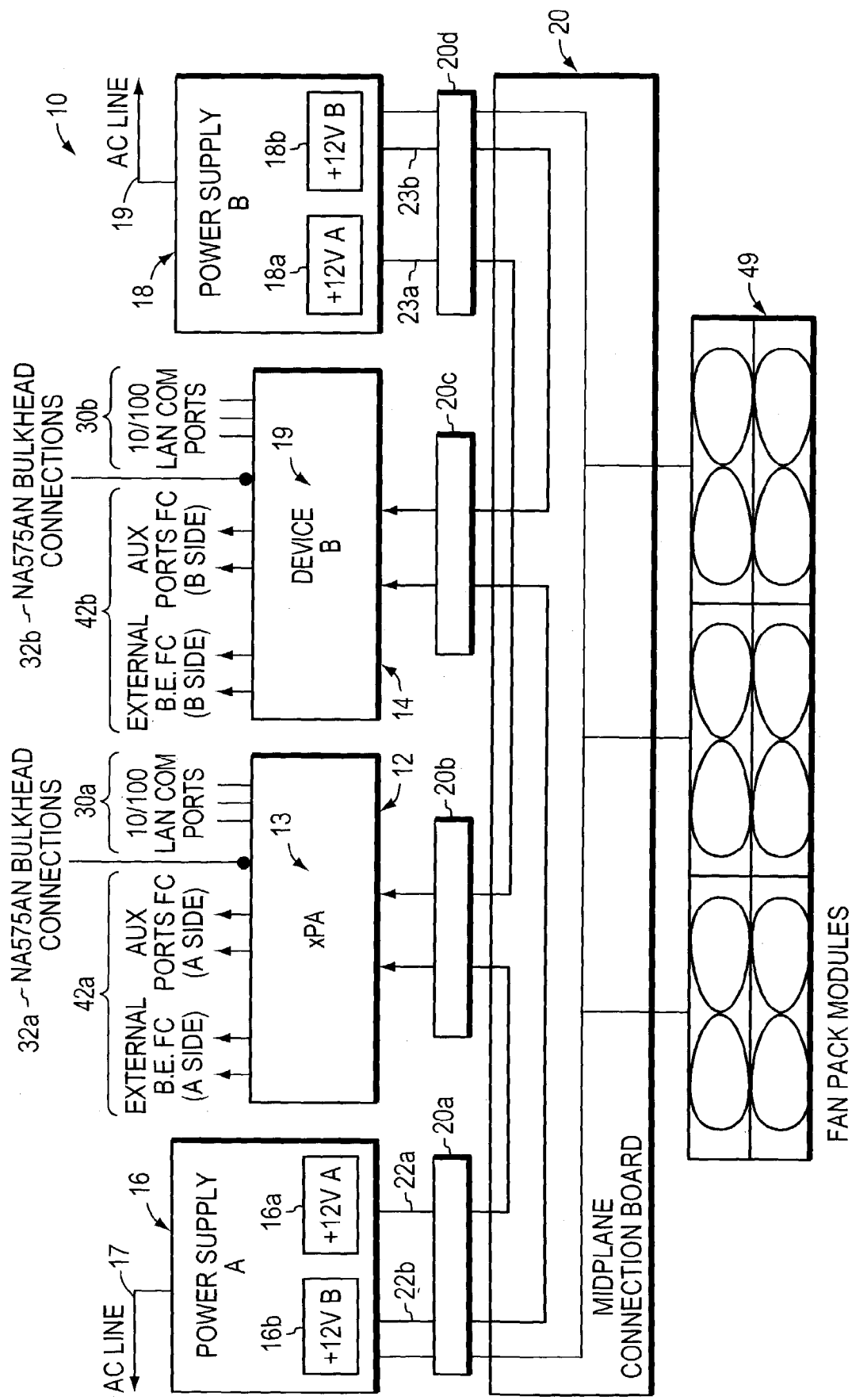
FIG. 1 is a block diagram of an exemplary high-availability networked storage system in which the present invention may be used.

In accordance with one embodiment of the invention, an architecture for providing peer power control will now be described with reference to FIGS. 1–4. FIG. 1 is a block diagram of an exemplary high-availability networked storage system 10 including processor A 12 and processor B 14 coupled to power supply A 16 and power supply B 18 via a midplane connection board 20. The networked storage system 10 may be, for example, one of many storage devices that can be coupled together to form a Storage Area Network (SAN), such as the CLARiiON family of networked storage devices produced by EMC Corporation of Hopkinton Massachusetts.

In the embodiment of FIG. 1, processors A and B are networked storage processors capable of receiving input from a local area network (not shown) via network ports 30a and 30b. Data and control are transferred between the processors and from a Storage Area Network (SAN) or Network Area Storage (NAS) via bulkhead connectors 32a and 32b. In addition, the processor is capable of driving external and auxiliary devices via lines 42a and 42b respectively. The two processors also communicate directly with each other over a pair of Common Management Interface (CMI) signal pair 43. As mentioned above, the processors 12 and 14 are also coupled to the midplane connection board via midplane connectors 12a and 14a respectively.

Although networked storage devices are described herein having certain input and output capabilities, it should be understood that the present invention is not limited to a specific type of processor element, but rather may be implemented in any processing device capable of operating in the manner described below.

The power supplies 16 and 18 are each separately coupled to independent AC input lines 17 and 19. Each of the power supplies 16 and 18 include two sub-converters 16a, 16b and 18a, 18b, respectively, or similarly independent and controllable output power branches. The sub-converter 16*a* within power supply A 16 is coupled to processor A via line 22*a* and the sub-converter 16*b* within power supply A 16 is coupled to processor B via line 22*b* through the power supply midplane connector 20*a*. The sub-converter 18*a* of power supply B 18 is coupled to processor A via line 23*a* and the sub-converter 18*b* of power supply 18 is coupled to processor B via line 23*b* through the power supply midplane connector 20*d*. Thus, each power supply is capable of driving either, or both of the processors 12 and 14 using the associated branch power supplies. Control lines (shown in FIG. 2) are coupled from the processors 12 and 14 to the power supplies 16 and 18 and are used in accordance with the present invention to control the reset of the power supplies. As will be discussed in further detail below, certain safeguards are included to ensure that power supplies are not erroneously cycled by faulty processing signals.

FIG. 1 also illustrates that the power supplies 16 and 18 are coupled together via a separate power line 44 to drive a set of fan pack modules 49. Although two power supplies are shown in this exemplary embodiment, it will be appreciated that the present invention could be implemented in any system having at least as many power supply branches as there are processors.

Figure 2:
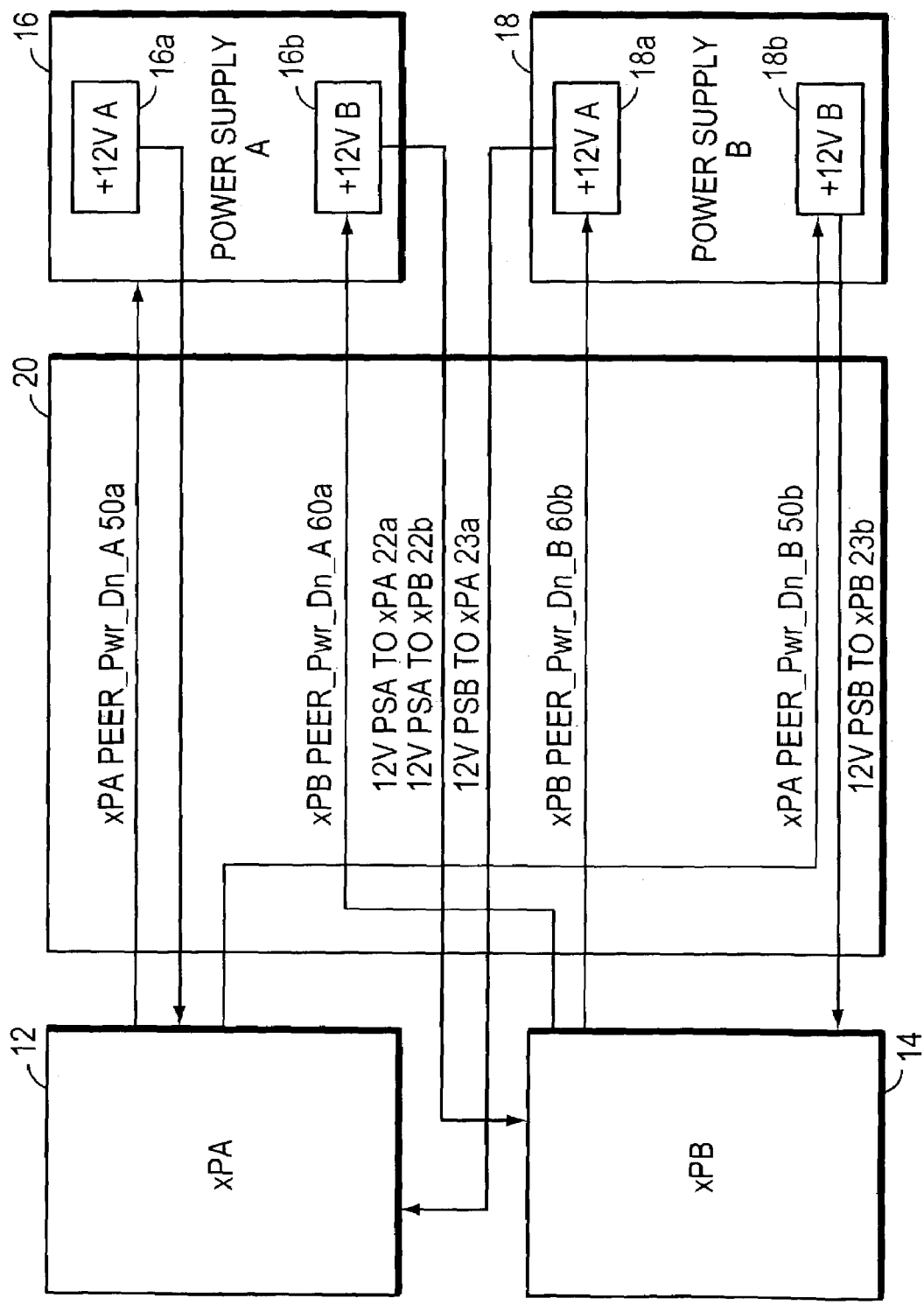
FIG. 2 is a block diagram illustrating a subset of interface signals that are provided between the processors and power supplies of FIG. 1 in accordance with the present invention.

Referring now to FIG. 2, the control and data interface data paths between the processors 12 and 14 and the power supplies 16 and 18 over the midplane connection board 20 are shown in greater detail. While there are many other signals that are exchanged between the processors and power supplies, for ease of explanation only those relevant to the present invention are described herein.

As mentioned above, each of the power supplies 16 and 18 provide a separate input to the pair of processors 12 and 14 from their respective sub-converters. However, according to one aspect of the invention, the provision of power to one of the processors is controlled by the other processor of the pair, also referred to herein as its 'peer'. In the embodiment of FIG. 2, each of the processors drives a pair of signal lines, with one of the pair of signal lines going to a separate one of the power supplies. Thus, for example, processor xPA 12 drives the signals xPA Peer_Pwr_Dn_A 50*a* to sub-converter 16*b* of power supply 16 to control the shut off the 12V power from power supply A to processor xPB, and also drives the signal xPA Peer_Pwr_Dn_B 50*b* to sub-converter 18*b* of power supply 18 to control the shut off of the 12V power supply from power supply B to processor xPB. When both these signals are asserted, (wherein 'asserted' herein means set to whatever voltage level disables the power) all power sources are removed from processor xPB, and the processor is reset. Similarly, processor xPB 14 drives the signals xPB Peer_Pwr_Dn_A 60*a* to sub-converter 16*a* in power supply 16, and also drives the signal xPB Peer_Pwr_Dn_B 60*b* to sub-converter 18*a* in to power supply 18. When both signals 60*a* and 60*b* are asserted, both power supply 16 and power supply 18 will cease providing power to processor xPA, and the processor is reset. (Together hereinafter the signals 50*a*, 50*b*, 60*a* and 60*b* may be referred to as 'shutdown signals'). Reset of a processor device is thus controlled solely by the associated peer device. Such an arrangement reduces the size, cost and complexity of networked storage design because it removes the need to include one or more supervisory processors to provide the system reset function.

The architecture of the peer power control design illustrated in FIG. 2 also provides fault tolerance by precluding a processor from being reset erroneously. The architecture achieves this feature in the following manner. Because both processors are driven by each of the separate power supplies, a processor will remain in active state as long as it is able to receive power from at least one of the power supplies. For example, if a hardware or software failure at processor xPA 12 causes one of the shutdown signals (50*a*) to become asserted in error, the associated power supply (PSA 16) will stop providing power to the peer processor xPB 14 on line 12V PSA to xPB 22*b*. However, the peer processor xPB 14 still receives power from the power supply 18 on line 12V PSB to xPB 23*b* and therefore will still function properly.

Figure 3:
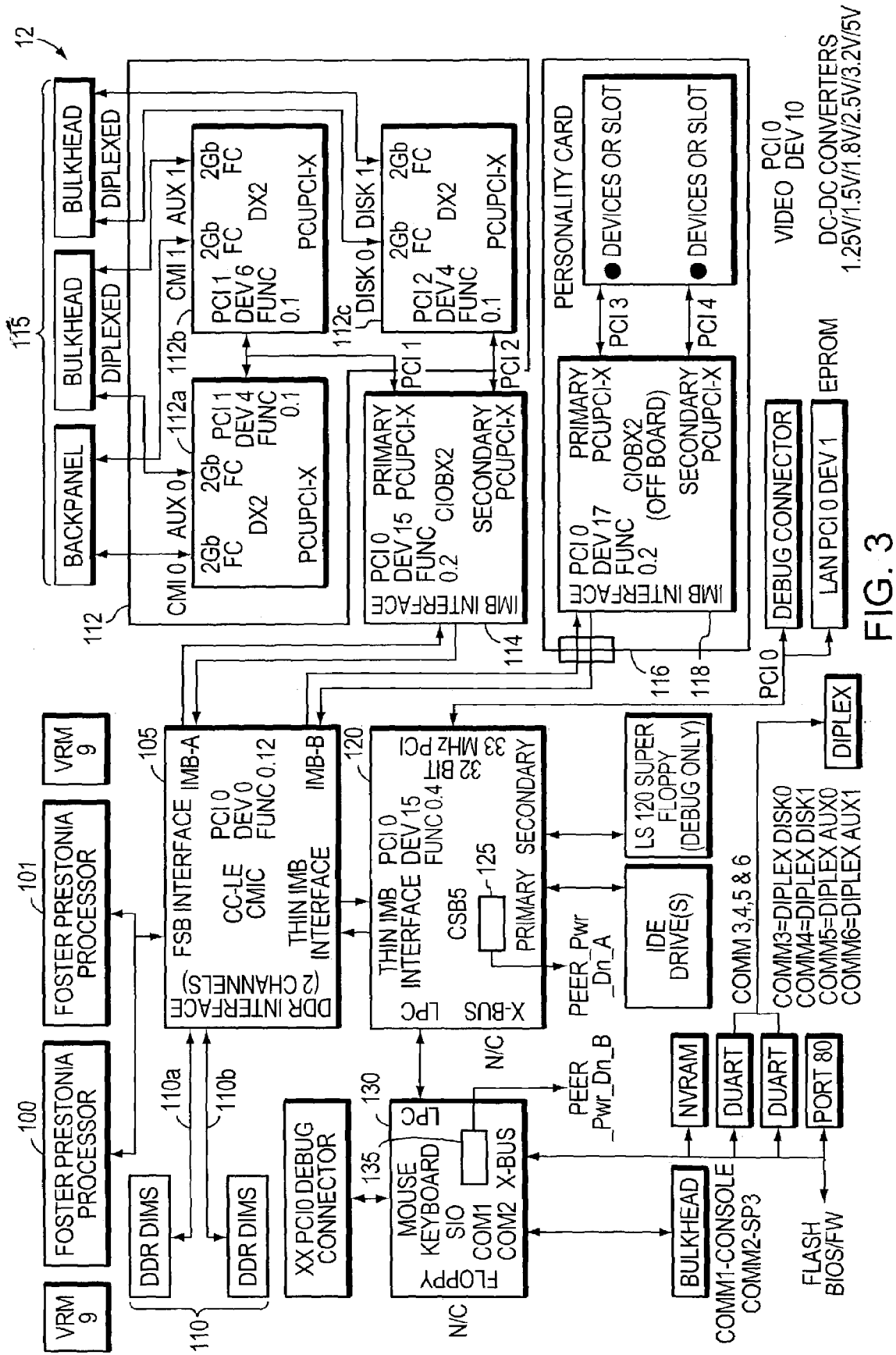
FIG. 3 is a block diagram of an exemplary processor card that may be used to provide control signals to a power supply in accordance with the present invention.

In accordance with another aspect of the invention, certain safeguards are introduced into the architecture to reduce the possibility of an error causing both signals to be asserted simultaneously in error. Referring now to FIG. 3, a block diagram of one embodiment of the processor 12, wherein processor 12 is a processing motherboard comprised of a number of different components. The processor 12 includes two central processing units 100, 101 coupled to a Command Management Interface Chip (CMIC) 105. The CMIC 105 is the bridge between the processors 100, 101, the memory system 110, and Input/Output (IO) subsystems. The memory system 110, in one embodiment is comprised of 8 DDR DIMM slots divided equally and 2-way interleaved among 2 DDR busses 110*a* and 110*b*.

The CMIC 105 interfaces with various Input/Output (IO) paths through source synchronous Inter Module Busses (IMB). The CMIC 105 is coupled to a fiber channel devices 112 via IO bridge chip (CIOBX2) 114, thereby providing a datapath connection to a SAN/NAS network via ports 115. The CIOBX2 114 is a PCI/PCI-X bridge from the CMIC via the IMB bus. The CIOBX2 has 2 PCI/PCI-X interfaces which can independently run as PCI or PCI-X at 33, 66, 100 or 133 MHz. In one embodiment, six Fibre Channel interfaces are packaged in 3 DX devices 112*a*, 112*b*, 112*c*, each of which contains 2 independent Fibre Channel interfaces in a single package. Two of the six interfaces are used to drive the CMI signals 43 (FIG. 1). Two others are used for backend disk traffic and other functions. The remaining two interfaces are typically for front end connections to devices such as a fibre backup device, directly to hosts, remote mirror, or to a Storage Area Network.

CMIC 105 may also be advantageously coupled to a personality card 116, which also includes CIOBX2 118 to support an additional two PCI interfaces on the card 116.

Also coupled to the CMIC 105 is south bridge chip (CSB) 120. CSB 120 is connected to the CMIC through a "Thin" IMB, that is an IMB interface that does not support a bill IMB instruction set. The major functions performed by the CSB 120 are bus interface and compatibility PCI bus functions. The CSB is coupled to a Super I/O (SIO) chip 130 by LPC bus 122.

Both the CSB 120 and the SIO 130 includes a number of writable control registers. In particular, the CSB includes a control register 125 that, when written, causes the signal "Peer_Power_Down_A" to be asserted for a predetermined period of time. The SIO includes a writable control register 135 that, when written, asserts the signal "Peer_Power_Down_B" for a predetermined period of time.

The predetermined period of time is design dependent, but basically should be equal to the amount of time determined to be required to propagate the signal to the power supply and allow the power supply to cycle the voltage at the peer device. After the predetermined period of time, the Peer_Power_Down_A signal deasserts and the associated register is reset. Thus, the signal will not assert again until the register is rewritten. This behavior is the same for all of the shutdown signals.

Each of these registers 125 and 135 are written by writing to different IO mapped addresses, and are therefore said to be logically separated in the design of the system. In addition, because the physical registers are stored in different components on the processor module 12, the registers are also said to be physically separate in the system. Separating the logical and physical locations of the registers protects the peer reset control architecture against both software and hardware faults. Because each writable register is written at a separate IO address, the system is protected against a software fault erroneously writing at an incorrect register location. Even if such an error occurs and one register is erroneously written, the likelihood that the second register would be affected by the same action is minimal. In addition, because the registers are located on two distinct components, the architecture is protected in the event that registers in one of the components should become faulty. Again, even if the registers in one of the components becomes faulty, and a shutdown signal is erroneously triggered, the other shutdown signal will remain in its correct state, and the processor functionality will be preserved.

Although a specific register configuration has been shown in FIG. 3, it will be readily apparent to one of skill in the art that the present invention is not to be limited to the provision of certain registers on specific components. Any register configuration is meant to be encompassed by the invention. And, although the separation of the registers is advantageous for the reasons listed above, it is not a requirement of the present invention.

Figure 4:
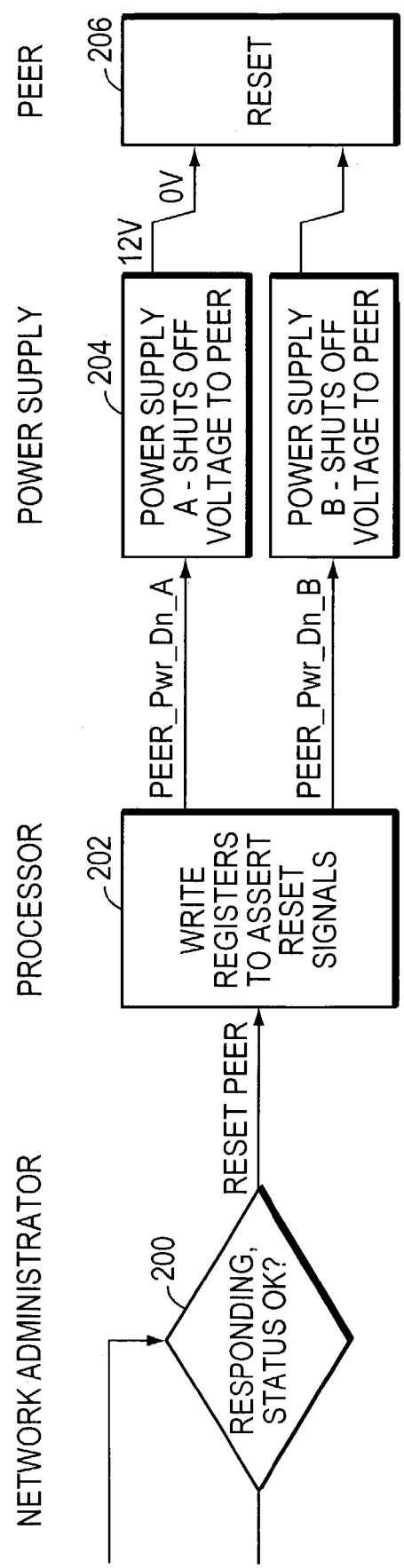
FIG. 4 is a flow diagram illustrating a process for providing peer reset in the networked storage device of FIG. 1.

Referring now to FIG. 4, a functional flow diagram illustrating a process for performing peer reset is shown. In the diagram, the individual components of the networked system that perform the various steps are labeled at the top, the boxes indicate the functions performed at the respective components, and the interconnection lines between the boxes represent signals passed between the components. At steps 200, it is determined whether one of the processors has entered an unstable condition. This determination may be made in a variety of manners known to those of skill in the art. For example, in one embodiment, an administrator on a network coupled to the networked storage device 10 may periodically request status or information from each of the processors 12 and 14. The status may range from simple, periodic 'keep-alive' pings to requests for performance statistics. In the event that the network administrator does not receive acknowledgements from one of the processors in an expected period of time, and if the processor continues to be non-responsive, the administrator may presume that the processor has become unstable.

Once it has been determined that the processor has become unstable, then the network administrator notifies the processor device in the networked storage system that its peer has become unstable by issuing the signal Reset Peer. (For example, if processor 14 of FIG. 1 became unstable, processor 12 would be notified of this condition). At step 204 the processor issues two write instructions, the first to the register that causes the Peer_Pwr_Dn_A signal to be asserted to reset power supply A, and the second to the register that causes the Peer_Pwr_Dn_B signal to be asserted.

Upon receipt of the power down signals at each of the power supplies, at step 206 each power supply shuts off its voltage to the non-responsive peer for a predetermined period of time. The predetermined period of time is the time specified by the processor design to cause it to reset its state, and may vary according to the processor specification and is not a limitation of the present invention. For example, in one embodiment the duration of time that the power needs to be removed for the processor to reset is one second. After the power cycle has completed, the peer is reset and the network administrator can determine whether operations can resume normally.

Accordingly, an architecture has been described that provides peer power control while maintaining high availability system support at low cost. Cost is reduced by eliminating the provision of one or more supervisory processors and minimizing the complexity of the supervisory functionality. Rather, power reset is controlled through the peer device. In addition, the architecture, by providing two power sources to each of the processors, minimizes the likelihood of erroneous reset. Advantageously, the likelihood can be further diminished by separately sourcing the pair of signals that is provided by a processor to reset the power supplies to the peer.

The present invention is not to be limited in scope by the specific embodiments described herein. For example, although the discussion above has been directed to the use of the peer reset control architecture in a networked storage device, it should be readily apparent that it may be used to remove the supervisory reset function in any system having multiple processors powered by multiple power supplies. Indeed, various modifications of the present invention, in addition to those described herein, will be apparent to those of ordinary skill in the art from the foregoing description and accompanying drawings. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. All such modifications are intended to fall within the scope of the following appended claims. Accordingly, the claims set forth below should be construed in view of the full breadth and spirit of the present invention as disclosed herein.

We claim:

1. A device comprising:
   at least two processors; and
   at least two power supplies coupled to the at least two processors, each of the at least two power supplies further comprising a power branch for each processor of the at least two processors for providing power to the associated processor, wherein each processor controls at least one power branch in both of the at least two power supplies to affect the provision of power by the at least two power supplies to the at least two processors.

2. The device of claim 1 further comprising means for precluding each one of the at least two processors from erroneously causing the at least two power supplies to stop providing power to the other one of the at least two processors.

3. The device of claim 1 further comprising:
   a first pair of control signals controlling the coupling of a first one of the at least two processors to its associated power branch in each of the power supplies, the first pair of control signals being sourced by a second one of the at least two processors; and
   a second pair of control signals controlling the coupling of a second one of the at least two processors to its associated power branch in each of the power supplies, the second pair of control signals being sourced by the first one of the at least two processors.

4. The device of claim 3, wherein the first one of the at least two processors includes means for causing the at least one signal in the second pair of control signals to reset the second one of the at least two processors.

5. The device of claim 4, wherein the means for causing the at least one signal in the second pair of control signals to reset further comprises a register associated with each one of the power supplies.

6. The device of claim 5, wherein each register associated with each power supply is logically separated in the first one of the at least two processors.

7. The device of claim 5, wherein each register associated with each power supply is physically separated in the first one of the at least two processors.

8. The device of claim 1, wherein each power supply is apportioned into a plurality of branches corresponding in number to a number of processors of the at least two processors, and wherein each one of the plurality of branches provides power to only one of the processors.

9. The device of claim 8, wherein each one of the plurality of branches is controlled by a different one of the processors than it provides power to.

10. A processing device comprising:
a first bus for communicating with a peer processing device; and
a second bus comprising a plurality of control signals, each one of the control signals for communicating with one of an associated plurality of power supplies, wherein each power supply of the plurality of power supplies includes a power branch dedicated to providing power to the peer processing device, each control signal for causing the associated power supply to disable power provided by the power branch to the peer processing device.

11. The processing device of claim 10, further comprising:
a plurality of registers, each one of the registers associated with a corresponding one of the plurality of control signals for controlling a value of the control signal.

12. The processing device of claim 11, wherein each one of the registers is logically separated from other registers in the plurality of registers in the processing device.

13. The processing device of claim 11, wherein each one of the plurality of registers is physically separated in the processing device.

14. A power supply comprising:
a pair of power branches, with each power branch of the pair dedicated to providing power to a different processing device in the pair of processing devices;
means for receiving a first control signal from a first processing device of the pair at a first power branch of the pair dedicated to providing power to a second processing device of the pair;
means for receiving a second control signal from a second processing device of the pair at a second power branch of the pair dedicated to providing power to the first processing device;
means for disabling the provision of voltage to the first processing device in response to the control signal from the second processing device; and
means for disabling the provision of voltage to the second processing device in response to the control signal from the first processing device.

15. A device comprising:
a pair of power supplies, each power supply of the pair including a pair of power branches;
a pair of processors coupled to the pair of power supplies, each processor of the pair receiving power from a first power branch of each of the power supplies, and including means for controlling a second power branch of each of the power supplies to disable the provision of power to the other processor of the pair.

16. A method of resetting a system, the system including a pair of processing devices coupled to at least two power supplies, the method including the steps of:
notifying a first one the pair of processing devices that the other one of the pair of processing devices is in an unstable state;
in response to the step of notifying, the first one of the processing devices signaling a power branch in each of the at least two power supplies that is dedicated to the other one of the pair of processing devices to cycle power to the other one of the processing devices further including the step of precluding the first one of the pair of processing devices from erroneously signaling both of the at least two power supplies.

17. The method of claim 16, wherein the step of precluding the first one of the pair of processing devices includes the step of providing, at the first one of the pair of processing devices, a separate mechanism for signaling each power branch of each of the at least two power supplies.

18. The method of claim 17, wherein the separate mechanism comprises at least two writable registers, each one of the two writable registers associated with a different one of the least two power supplies.

19. The method of claim 18, wherein each writable register is logically separated in the system.

20. The method of claim 18, wherein each writable register is physically separated in the system.

* * * * *